United States Patent [19]

McNally et al.

[11] Patent Number: 6,159,906

[45] Date of Patent: *Dec. 12, 2000

[54] OIL WELL DRILLING FLUIDS WITH IMPROVED ANTI-SETTLING PROPERTIES AND METHODS OF PROVIDING ANTI-SETTLING PROPERTIES TO OIL WELL DRILLING FLUIDS

[75] Inventors: Keith McNally, Bedminster; Hemi Nae, Princeton, both of N.J.; James Gambino, Yardley, Pa.

[73] Assignee: Rheox, Inc., Hightstown, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/941,701

[22] Filed: Oct. 1, 1997

[51] Int. Cl.[7] .................................................. C09K 7/00
[52] U.S. Cl. ............................................ 507/119; 507/140
[58] Field of Search ...................................... 507/119, 140

[56] References Cited

U.S. PATENT DOCUMENTS

| | | | |
|---|---|---|---|
| 2,444,328 | 6/1948 | Blair | 44/393 |
| 4,600,761 | 7/1986 | Ruffner et al. | 526/270 |
| 4,728,445 | 3/1988 | Hale | 507/120 |
| 4,826,611 | 5/1989 | Blair | 507/120 |
| 5,191,051 | 3/1993 | Shay et al. | 526/301 |
| 5,208,216 | 5/1993 | Williamson et al. | 507/120 |
| 5,260,268 | 11/1993 | Forsberg et al. | 507/133 |
| 5,283,235 | 2/1994 | Bush et al. | 507/118 |
| 5,362,415 | 11/1994 | Egraz et al. | 252/174.24 |

*Primary Examiner*—C. H. Kelly
*Attorney, Agent, or Firm*—Michael J. Cronin

[57] ABSTRACT

An improved drilling fluid with enhanced anti-settling properties useful for oil well drilling systems is described. The invention includes a process for providing anti-settling properties to oil invert (i.e., water in oil emulsion) based fluids. The drilling fluid/drilling mud invention contains at least one copolymer reaction product of which the reactants comprise at least one ethylenically unsaturated carboxylic compound and at least one alpha-olefin. As an alternative embodiment one or more rheologically-active clays including organoclays and smectite clays in combination with such copolymer reaction product are also added to the drilling fluid. The invention also includes an anti-settling additive comprising a rheologically active clay and the above described copolymer.

36 Claims, No Drawings

OIL WELL DRILLING FLUIDS WITH IMPROVED ANTI-SETTLING PROPERTIES AND METHODS OF PROVIDING ANTI-SETTLING PROPERTIES TO OIL WELL DRILLING FLUIDS

BACKGROUND OF THE INVENTION

1. Field of the Invention

The present invention pertains to improved fluids known in the oil service industry as drilling fluids or muds, and, in particular, to invert emulsion types of drilling fluids in which water is dispersed in an oil-based medium. The invention is particularly directed to providing enhanced anti-settling properties to such drilling fluids; that is, the invention enhances the ability of such fluids to retain in suspension, and to convey along with the fluid, a variety of types of solid particles.

The invention discloses new drilling fluids, which are distinguished by improved anti-settling properties, high ecological acceptability, and at the same time good storage and application properties.

An important area of application for the new disclosed drilling fluids is in both on- and off-shore wells for the development of hydrocarbon deposits, the aim of the invention being particularly to make available industrially—usable drilling fluids with enhanced anti-settling properties. The new drilling fluid systems can also be used in land-based drilling operations beyond those for oil and hydrocarbons.

2. Description of the Prior Art

Anti-settling Properties of Drilling Fluids

Early oil well drilling was done with hammer bits. Shortly after the beginning of United States commercial oil drilling operations in Pennsylvania and Ohio, the oil industry introduced motor-driven rotary drilling bits which used "drilling muds" or drilling fluids along with the motor-driven bits. Drilling fluids have been much the subject of development over the subsequent years which development continues to date.

Drilling fluids, in their almost infinite variety, today must be pumpable under pressure down through strings of drilling pipe, then through and around the drilling bit head deep in the earth, and then returned back to the earth surface through an annulus between the outside of the drill stem and the hole wall or casing. A casing over the natural hole wall surface is sometimes installed while the hole is being drilled to target depth.

Drilling base muds, the liquid carriers of the system, are often comprised of oils (diesel, mineral, and poly(alpha-olefin)), propylene glycol, methyl glucoside, modified esters and ethers, water, and emulsions of oil and water of varying proportions.

Beyond providing drilling lubrication and efficiency, and retarding wear, drilling fluids must accomplish a number of important interrelated functions falling under the term, "anti-settling" for these fluids to satisfy the minimum requirements for commercial drilling fluids. These functions can be grouped as follows:

(1) The fluid must suspend and transport solid particles to the surface for screening out and disposal, (2) The fluid must suspend additive weighting agents (to increase specific gravity of the mud), generally finely ground barytes (barium sulfate ore), and (3) The fluid must transport clay and other substances capable of adhering to and coating the borehole surface, both to exclude unwanted fluids which may be encountered, such as brines, preventing them from mixing with and degrading the rheological profile of the drilling mud, and to prevent the loss of downhole pressure from fluid loss into porous formations.

The interrelatedness of these anti-settling functions can be seen by the fact that unwanted materials to be removed at the surface can include not only "cuttings" from the material through which the bit is passing, but also broken pieces of the drill bit itself, spent barytes or other weighting materials, and substances such as gellants and salts created when other fluid constituents become "spent" through harsh drilling conditions such as reaction processes under the temperatures encountered in deeper wells. Thus, substances added to achieve a desirable property, such as improved lubrication or pressure control, potentially result in the ultimate creation of a waste to be removed by the drilling fluid. In addition, every reformulation of a drilling fluid potentially alters the physical characteristics of the fluid in a way that inhibits the removal of unwanted ingredients.

Drilling fluids are thixotropic systems. That is, (1) they exhibit low viscosity when sheared, such as when in circulation (as by pumping or otherwise) but, (2) when the shearing action is halted, the fluid sets or gels to hold the solids it contains in place. The fluid must become gelled relatively rapidly, reaching a sufficient gel strength before suspended materials fall downward any significant distance. This gellation behavior must be totally reversible.

In addition, even when the drilling fluid is a free-flowing near-liquid, it must retain a sufficiently high enough viscosity to carry all unwanted particulate matter from the bottom of the often deep hole to the surface. While not used in highly environmentally sensitive areas, upon long-term interruption of circulation when drilling fluid must be ejected from the borehole and placed into a holding area near the bore hole, the drilling fluid gel structure must also be such as to allow the cuttings and other unwanted particulates to settle out from the liquid fraction over time.

Drilling muds and their compositions have over the years involved the attention of both scientists and artisans, with thousands of various improvements made and patented. One of the principal problems facing "mud chemistry" scientists and technicians is the production of drilling fluids having satisfactory dispersibility, with the necessary subsidiary thixotropic properties discussed above, while at the same time possessing the above-described critically important anti-settling properties. Fluids and their additives involve highly complex chemical, physical and rheological analysis using state-of-the-art scientific apparatus and intricate mathematical calculations and modeling.

"Anti-settling" involves considerations of assurance of suspension and control of widely-varying matter covered under the general rubric "cuttings." It entails a different measure of control when shear rate and force is high, low, or non-existent, and requires control of syneresis and deposition of such particles over wide ranges of a) temperature (from 0° to as high as 300° C.), b) time durations, c) pressures (from only a few bars to those exerted by a column of fluid that can extend for thousands of feet) and d) drilling directions (from vertical to horizontal).

A search has been going on for many years for an improved additive for modifying and controlling the suspension properties of drilling fluids that will provide fluids which are efficient, easily handled, and readily dispersible, and usable under a broad range of conditions.

Drilling Muds/Oil-Based Invert Emulsion Drilling Fluids

Drilling fluids or muds are typically classified according to their base fluid or continuous phase, as "water-base muds"

and "oil-base muds". Drilling muds may contain a mixture of base fluids, and are typically classified by the predominating or continuous base fluid, with the fluid present in lesser quantities becoming the internal or emulsified phase.

Another class of drilling muds, in addition to water-based muds and oil-based muds, are pneumatic muds, in which drill cuttings are removed by a high velocity stream of air or another gas, including natural gas.

Oil-base muds, for example, may have an aromatic or aliphatic oil, or a mixture of oils, as the continuous phase. These oils may include diesel, mineral or synthetic (PAO, esters, ether) oil. They may be comprised entirely of oil or, more commonly, may contain water ranging from 5% to upwards of 50–60%. In this mud, water becomes the internal phase, is emulsified into the oil as a heterogeneous fine dispersion, and the resulting system is referred to as an oil-based or oil-invert emulsion mud.

The invention hereof is particularly useful for oil-based invert emulsion drilling fluids. These fluids are generally used in the United States, and elsewhere such as in the North Sea, and consist of a three-phase system: oil, water, and fine particulate solids. The aqueous phase may be a brine. The addition of brine reduces the overall price of the fluid, reduces the risk of combustion of the oil, and improves the water acceptance of the mud. The brine of choice is commonly an aqueous solution of an inorganic salt such as sodium chloride or calcium chloride.

Drilling on Land and Off-Shore

Hydrocarbon drilling for exploratory (and production) wells has long been done on land. In the last 30 to 40 years, such drilling has been done from platforms located in water settings; so-called off-shore drilling. Shallow fresh and salt water drilling operations generally employ different equipment than deeper water operations. Shallow fresh or salt water drilling operations most often use barges or fixed rigs while deep water off-shore operations employ jack-ups, semi-submersibles, and floating drillship rigs.

In off shore drilling, drill cuttings removed from the bore-hole must either be discharged to the surrounding body of land or water, or transported to a remote location; the liquid phase of spent drilling fluids must similarly be disposed of. The disposal of cuttings may be inhibited by the presence of harmful substances adhering to cuttings particles, whether oil from the fluid or a material encountered in the borehole.

The use of oil-based invert emulsion drilling fluids or muds in oil exploration has been increasing rapidly over the last twenty years owing to the more demanding requirements encountered in drilling deep and/or non-vertical and deviated wells. Compared with the longer-established oil and water based muds including diesel and mineral oil based muds, such invert oil based drilling muds possess a number of advantages, including reduced interaction with earth formations, greater thermal stability and improved lubricity.

The drilling fluids and methods of this invention are particularly useful for oil-based invert emulsion drilling fluid systems.

Directional Drilling and the New Problems as to Settling that it Causes

The requirements for drilling muds as they relate to anti-settling properties have also become even more complex as a result of the introduction over the last 20 years of directional drilling technology, in which at least a portion of the well is drilled at an angle other than vertical. Such wells are also known as deviated wells.

Procedures for deviating wells have improved greatly over recent years with the introduction of more powerful and reliable downhole motors, and the introduction of more accurate interpretation of wireline data as well as utilization of the latest computerized downhole and sensing equipment, including improvements in sound and microwave transmissions. These techniques are collectively referred to as Measurement While Drilling (MWD) techniques, because they permit the obtaining of data relating to down-hole conditions without the need to remove the drill string.

The advantages of directional drilling are becoming well-known: such drilling permits (1) the salvaging of boreholes blocked by debris (such as tools which have become inextricably lodged); (2) the use of more economical land-based equipment to explore the immediate off-shore environment; and (3) the drilling of multiple wells up to several miles from one another, sharing the cost of a single platform. In certain formations, increased production can be achieved by deviating the well off-vertical so as to facilitate perforation and development of a narrow producing zone, or redevelopment of a depleted formation.

There are, however, a number of inherent problems in this approach to directional drilling, which affect the anti-settling requirements or sag properties as referred to in the drilling industry, of a drilling mud; namely:

(1) The amount of drilling mud required is increased, since the distances are greater, and the time required for the cuttings to reach the earth's surface also increases.

(2) The annulus carrying the mud with cuttings to the surface is no longer vertical and gravity on a horizontal hole pulls cuttings, weighting material and particulate matter, not controlled by the drilling fluid, to the lower side of the bore rather than the bottom of the hole.

Work In The Past

There are a large number of prior art patents relating to drilling fluids. The below is not intended to be an exhaustive summary.

U.S. Pat. No. 4,486,316 shows a drilling fluid comprising an aqueous dispersion of an emulsion polymerized latex comprised of an interpolymer of an olefinically unsaturated carboxylic acid monomer and at least one other, non-carboxylated polymerizable monomer, the latex being of a type which undergoes rapid increase in viscosity upon the addition of a sufficient amount of a basic material. U.S. Pat. No. 2,999,063 describes adding a mixture of a particular class of amine and metallic soap to a mixture of water in oil and describes that the mixture provides emulsion properties to drilling and packing fluids. U.S. Pat. No. 4,374,737 relates to a drilling mud composition having non-polluting, non-diesel fuel-based properties. The invention is directed to a non-polluting additive for improving the rheological properties of drilling muds consisting of the following ingredients: a diethanolamide of a specific formula, tall oil fatty acid and an imidazoline/amide mixture consisting essentially of three specifically defined chemicals.

U.S. Pat. No. 5,254,531 describes oleophilic basic amine additives for invert drilling muds to regulate the flowability and pumpability of the drilling mud. The patent describes adding to the mud, containing an esterified oil, a basic amine compound having an oleophilic character and limited solubility in water and thereby forming in situ in the drilling mud an oil-soluble salt with said amine compound and a carboxylic acid formed by hydrolysis of the ester. U.S. Pat. No. 3,879,298 shows a method of controlling the rheology of a fresh water drilling fluid contaminated with salt by incorporating therein an ethylenedicarboxylic acid additive. The additive may comprise maleic acid, maleic acid anhydride, and mixtures thereof U.S. Pat. No. 4,781,730 describes an alkali metal or alkaline earth metal-containing composition (with or without a hydrocarbon-soluble dispersant) which is combined with the reaction product of a carboxylic acid and a polyhydroxyalkanolamine, with the preferred reaction product being an ester which forms between the hydroxyl moieties of the alkanolamine and the carboxylic acid (anhydride). The reaction product of the carboxylic acid and polyhydroxyalkanolamine acts as a demulsifier for the alkali metal or alkaline earth metal-containing composition. The patent describes a composition comprising a hydrocarbon-soluble or dispersible alkali metal or alkaline earth metal containing composition, and the reaction product of a polybasic acid and a polyhydroxyalkanolamine of the formula RN[(AO)$_x$H][(DO)$_y$H]. The polybasic acid may be either an acid or an anhydride, and is preferably a dicarboxylic acid.

Several prior art patents disclose chemistry and chemical reactions which may be of interest.

Japanese Patent Application No. 62-69957 describes a sag preventer for non-aqueous coatings comprising a mixture of two different fatty acid amides wherein fatty acid amide (A) is obtained by reacting a mixture of at least one straight chain saturated fatty acid having 3–4 carbon atoms and 12-hydroxystearic acid (the molar ratio of the fatty acid and 12-hydroxystearic acid being 1:9–8:1) and ethylene diamine or hexamethylene diamine and fatty acid amide (B) is obtained by reacting a mixture of at least one straight chain saturated fatty acid having 6–22 carbon atoms and 12-hydroxystearic acid (the molar ratio of the fatty acid and 12-hydroxystearic acid being 0:10–8:2) and ethylene diamine or hexamethylene diamine, wherein the weight ratio of fatty acid amide (A) to fatty acid amide (B) is 100:00–20:80.

U.S. Pat. No. 5,374,687, issued to the assignee hereof, discloses a paint additive for water-reducible paints which is a low molecular weight reaction product of an alpha-olefin and an alpha, beta-ethylenically unsaturated carboxylic acid. See also U.K. Patent No. 1,268,418 showing dispersion aids for resinous plastics using similar copolymers.

SUMMARY AND OBJECT OF THE INVENTION

Object of the Invention

It is an object of the invention to provide a drilling fluid with improved suspension and anti-settling properties for containing various solid particles, including bore-hole cuttings, which fluid is easy to handle and use.

It is another object of the invention to provide stable suspensions of solid particles in drilling muds that do not exhibit excessive syneresis or "hard settling" during drilling operations. It is a further object of the present invention to overcome the problems and disadvantages of the prior art by providing a drilling fluid with anti-settling properties which provides excellent cutting suspension properties. A yet additional object of the invention is to provide a process for improving the anti-settling properties of drilling muds.

Additional objects and advantages of the invention will be set forth in part in the description which follows, and in part will be obvious from the description, or may be learned by practice of the invention. The objects and advantages of the invention will be realized and attained by means of the instrumentalities and combinations particularly pointed out in the appended claims.

DETAILED DESCRIPTION OF PREFERRED EMBODIMENTS

The present invention is based on the surprising discovery that neutralized ethylene-acrylic acid copolymers impart enhanced anti-settling and suspension behavior to oil-based invert drilling fluids including such fluids based on diesel, mineral oil and synthetic oil fluids. The discovery also includes the finding that combination of such copolymers with rheologically active clays, including organoclays, result in an effective anti-settling composition which provides enhanced anti-settling properties to such drilling fluids.

The useful copolymers to provide these properties to the novel drilling fluids of this invention are reaction products of at least one low molecular weight alpha-olefin compound and at least one alpha, beta-ethylenically unsaturated carboxylic compound which is then neutralized to form an amine salt. The copolymers are introduced into the drilling fluid of the present invention after neutralization in an amount of from about 0.5 to about 8 weight percent, more preferably in an amount from about 0.5 to about 3 weight percent, based on the weight of the drilling fluid.

The alpha, beta-ethylenically unsaturated carboxylic acid should be selected from carboxylic acids and anhydrides including mono-, di-, and multi- acids and anhydrides. Examples of such acids include acrylic acid, crotonic acid, itaconic acid, methacrylic acid, ethacrylic acid, maleic acid and fumaric acid. Useful are anhydrides of carboxylic acids such as phthalic anhydride and maleic anhydride. A most preferred compound is acrylic acid.

The alpha, beta-ethylenically unsaturated carboxylic acid or anhydride may be copolymerized with an olefin, preferably a low molecular weight alpha-olefin having 2 to 8 carbon atoms.

Olefins themselves are a class of unsaturated aliphatic hydrocarbons having one or more double bonds and are usually obtained by cracking petroleum fractions at high temperatures (1500°–1700° F.). Olefins with a single double bond are designated alkenes; those with two, alkadienes or diolefins. Alpha-olefins are so designated because the double bond is on the first carbon atom and they are particularly reactive.

Alpha-olefins containing carbon chains of $C_2$ to $C_{25}$ such as ethylene, propene, butene, pentene, and hexene are particularly useful. A sub class of such alpha-olefins, ethylene alpha-olefins, is particularly preferred to make the copolymers of the instant invention. The alpha-olefin is preferably selected from alpha-olefins having 3 to 8 carbon atoms. The concentration of the alpha-olefins to prepare the copolymer should be at least 50 mol percent and preferably above 80 mol percent in respect to the alpha, beta-ethylenexy unsaturated carboxylic acid(s) or anhydride(s).

A preferred copolymer is a copolymer of an alpha-olefin having 2 to 6 carbon atoms and an alpha, beta-ethylenically unsaturated mono-carboxylic acid.

The copolymer should be made to have an acid value in the range from about 20 to about 300, with an acid number from about 40 to 200 being preferred, and an acid number from about 40 to 120 being most preferred. The acid number is determined by the number of milligrams of potassium hydroxide necessary to neutralize one gram of copolymer acid.

The molecular weight of the low molecular weight copolymer acid should be from about 500 to about 20,000, preferably from about 1,000 to 15,000, more preferably from about 1,000 to about 6,000 and most preferably from about 1,000 to about 3,500.

Additionally, monomers which contain a polymerizable ethylenically unsaturated group may also be employed as reactants to prepare the copolymers of the present invention, provided that the monomers do not adversely affect the anti-settling properties of the copolymer. Exemplary suitable additional copolymerizable monomers, which contain at least one terminal

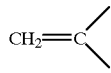

group, include vinyl acetate, vinyl pyrrolidione, methyl vinyl ether, and ethyl vinyl ether.

The copolymers used to prepare the drilling fluids of the present invention can be prepared by any suitable process known in the art.

Such copolymers also can be commercially obtained already prepared and then neutralized. Exemplary suitable commercially available ethylene-acrylic acid copolymers for use in the present invention include carboxyl-containing ethylene copolymers such as ethylene-acrylic acid-vinyl acetate terpolymers and maleic anhydride. Particularly suitable carboxyl-containing ethylene copolymers are commercially available under the A–C tradename from Allied Signal, Inc. and can be neutralized for purposes of this invention. Such copolymers can also be neutralized after introduction into the drilling fluid in which they are used.

The useful copolymers are preferably neutralized prior to being incorporated into the drilling fluid. The neutralization of ethylene-acrylic copolymers is well known in the art. The neutralizing agent employed can be a group 1A metal compound as well as ammonia and organic amines including mono-, di- and triethanolamine, diethylaminoethanol, 2-(2-aminoe-thylamino)ethanol, 2-amino-2-methyl-1-propanol and trimethylamine. Preferably, the neutralizing agent is selected from ammonia or amines such as mono-, di-and and triethanol amine, monoethylamine, monopropyl amine, ideithylaminoethanol, ethylene diamine, and 2-amine-2-methyl 1 1-propanol (commercially available as AMP-95 from Angus Chemical), and the like. Most preferably the neutralizing agent is selected from the group consisting of triethanol amine, n-methyl diethanol amine and diethylamino-ethanol.

Preferably, the amount of neutralizing agent to be used should be in an amount from 25% to 200% of the amount required to neutralize the copolymer, more preferably from about 75% to about 125% of the amount required to neutralize the copolymer, and most preferably in an amount of 1:1 molar ratio or in slight excess of 10% or less to completely neutralize all groups of the copolymer.

The useful polymers can be prepared by known techniques. For example, the ingredients (the copolymer acid, a neutralizing agent, and water) may be charged to a suitable reaction vessel which is capable of withstanding autogenous pressure and equipped with a mechanical stirrer and a thermometer. The materials can be added at any time and at any temperature and simultaneously or in any order during the heating with the requirement that the copolymer acid is neutralized and dispersed in water and a uniform liquid mass is obtained. The mixture is usually heated under an inert atmosphere to a temperature of 85°–140° C., preferably 100°–135° C. The use of an inert atmosphere is optional in that the presence of an inert gas such as nitrogen inhibits a dark coloring of the product but in no way affects product performance. The resulting liquid product is cooled with or without agitation, but slow agitation is preferred. In either case, a homogeneous fluid product is obtained which is then incorporated into a drilling fluid using known techniques for preparation of drilling fluids.

The compositions of the invention are useful, for example, in imparting anti-settling properties to a wide variety of oil-based invert emulsion drilling fluids including fluids based on diesel, mineral oil and synthetic base fluids. Invert emulsion drilling fluids and their components are described at length in U.S. Pat. No. 4,435,636, obtained by NL Industries, Inc., the parent company of the assignee herein.

The amount of the anti-settling ingredients used in a specific drilling fluid application is determined by numerous factors including the type of drilling fluid compositions that require an anti-settling additive, the constituents of the drilling fluid, and the level of performance desired. However, a preferred range is from about 1 to about 100 pounds per barrel of drilling fluid is believed effective. This approximately equates to an amount of from about 1 to about 8 weight percent, most preferably in an amount from about 1 to about 3 weight percent, of the drilling fluid.

To further enhance the anti-settling properties of the drilling fluid according to the present invention, additional reactants may, in some instances, be used in the synthesis.

A catalyst may also be used in the synthesis of the copolymer useful in the present invention. If a catalyst is used in the synthesis, it may be selected from any of those typically used in conventional reactions. Although limited only by the particular reactants and reaction conditions, the catalyst should generally be used in an amount of from about 0.001 to 2.0 percent by weight based on the total weight of the reactants.

A number of other additives besides anti-settling additives, providing other properties, can be used in the fluids of this invention so as to obtain desired application properties, such as, for example, Theological additives regulating viscosity, emulsifiers or emulsifier systems, weighting agents, fluid loss-prevention additives, wetting additives, and alkali reserves.

It has been discovered that use of the above described copolymers in combination with rheologically active clays, such as organoclays and smectite clays particularly bentonite and hectorite, provide enhanced and synergistic anti-settling effects.

Smectite clays are well known silicate based clays. Organoclays are also well known and are the reaction product of a smectite clay and one or more quaternary ammonium compounds. A very complete description of smectite clays and organoclays made from smectite clays is contained in U.S. Pat. No. 5,358,562 issued to Dr. Nae, one of the inventors herein—its description is incorporated by reference.

In an important aspect, the instant invention provides a unique anti-settling composition comprising the described co-polymers and Theologically active clays particularly organoclays and smectite clays such as bentonite and hectorite.

It is to be understood that the above are representative, commercially available products and other types of compounds are also useful for preparing the drilling fluids of this invention. The following examples are presented to illustrate the invention and should not be considered limiting.

EXAMPLE 1

240.0 g of an ethylene-acrylic acid copolymer (A–C 5120, commercially available from Allied-Signal, Inc.), 72.0 g of 98% triethanol amine, and 960.0 g water were added to a pressure reactor equipped with a mechanical stirrer and a cooling coil. With stirring, the mixture was heated to 135° C. and was heated at 135° C. for 30 minutes followed by cooling to 60° C. with air cooling via the internal cooling coils. Upon reaching 60° C., the mixture was further cooled to room temperature with water cooling via the internal cooling coils. The material, after cooling, was a white, opaque, homogenous liquid product and was designated Compound 1.

EXAMPLE 2

245.10 g of an ethylene-acrylic acid copolymer (A–C 5120, commercially available from Allied-Signal, Inc.), 58.06 g of 99% n-methyl diethanol amine, and 960.0 g water were added to a pressure reactor equipped with a mechanical stirrer and a cooling coil. With stirring, the mixture was heated to 135° C. and was heated at 135° C. for 30 minutes followed by cooling to 60° C. with air cooling via the internal cooling coils. Upon reaching 60° C., the mixture was further cooled to room temperature with water cooling via the internal cooling coils. The material, after cooling, was a translucent, homogenous liquid product and was designated Compound 1. The material was designated Compound 2.

EXAMPLE 3

In order to show the improvements available in the use of this invention a series of experiments were conducted. The following technique was employed:

The copolymer of Example 1 was incorporated into an oil-based invert emulsion drilling mud using a laboratory Hamilton Beach mixer set on high speed. The copolymer was added at a level of 14 pounds per barrel (ppb) at the end of the base mud mix cycle and incorporated into a mineral oil (MIO) based drilling mud formulation (80/20 invert as shown below) mud for 15–30 minutes. Hectorite clay (5–9 ppb) was added in the second test. The formulation, which used both a primary and secondary emulsifier, barite and a fluid loss additive is shown in Table 1.

TABLE 1

MIO BASED DRILLING FLUID FORMULATION

| Mineral Oil (bbl) | 0.52, or 200 mls |
|---|---|
| Primary Emulsifier (ppb) | 9 |
| Secondary Emulsifier (ppb) | 2 |
| Lime (ppb) | 5 |
| Brine, 30% CaCl$_2$ in water (bbl) | 0.17, or 60 mls |
| Bentone 38 (ppb) | 6 |
| Rheological Additive | |
| Compound 1 (ppb) | 5.8 |
| Fluid Loss Additive (ppb) | 8 |
| Barite (ppb) | 325 |
| Calc. Water phase salinity | 225,000 |
| Oil/Water Ratio | 80/20 |

The low shear viscosity of muds containing the copolymer were determined using a Brookfield viscometer, Model LVT, equipped with a #3 spindle after equilibrating the samples to 77° F. Dial readings were taken after 3 revolutions at 30 RPM or 1 minute at 0.3 RPM. The control mud contained 6 ppb of Bentone 38, an organoclay rheological additive obtainable from Rheox, Inc. All muds contained 6 ppb of Bentone 38 plus additional 5.8 ppb of the copolymer of Example 1 (Compound 1). Test results are given below in Table 2.

TABLE 2

| | Control | Compound 1 | Compound 1 and Hectorite Clay |
|---|---|---|---|
| Additive, level, ppb | — | 5.8 | 5.8/5 |
| Fann 660 @ 120° F. | 70 | 111 | 145 |
| 300 | 38 | 67 | 90 |
| 200 | 27 | 51 | 70 |
| 100 | 15 | 32 | 40 |
| 6 | 4 | 8 | 12 |
| 3 | 3 | 6 | 10 |
| Plastic Viscosity, cp | 32 | 44 | 54 |
| Yield Point, lbs/100 saft | 6 | 23 | 36 |
| Gels, 10 sec/10 min, lbs/100 saft | 6/9 | 9/31 | 10/39 |
| Brookfield Viscosity, cps | | | |
| 60 RPM | 214 | 650 | 900 |
| 30 | 348 | 941 | 1428 |
| 12 | 600 | 1700 | 2740 |
| 6 | 1000 | 2900 | 4600 |
| 3 | 1680 | 4480 | 7800 |
| 1.5 | 2960 | 7600 | 13200 |
| 0.6 | 6400 | 14800 | 26600 |
| 0.3 | 10400 | 26800 | 42800 |

Hot Rolled 16 hrs. @ 150° F.
Viscosity Read @ 120° F.

Discussion of Results

Results in Table 2 show that Compound 1 provides an increase in the low shear rate Brookfield and Fann 6 and 3 rpm viscosities, without substantially increasing plastic viscosity. Yield point increases by 383% while plastic viscosity increased by only 37% indicating greater low shear rate viscosity build. Improved anti-settling is indicated by higher low shear viscosity at all test temperatures versus the control. Syneregstic effect is shown by the composition of Compound 1 alone and in mixture with a clay. Further a synergistic effect can be seen with Compound 1 and hectorite clay. In this example, the low shear rate viscosity was enhanced while limiting the increase in plastic viscosity. It is believed the same would occur with the use of bentonite and other smectite clays.

As described previously, the anti-settling agent formed a network structure by interacting with the mud's ingredients and solvents to allow shear thinning while the mud is being sheared to enhance flow. When shearing is stopped, the network structure reforms quickly, thus keeping the heavy barites and other suspended materials from settling.

The effect of the invention composition is to form a gel like structure, which increases significantly the yield value and the low shear rate viscosity but does not significantly affect the high shear rate viscosity of the system. It was also observed that as soon as the external shearing is stopped, the system recovers quickly to its original viscosity.

EXAMPLE 4

Additional tests were run as follows. Table 3 shows a control test without an additive of the invention. Table 4 shows additional tests using Compound 1 and an organoclay in combination while Table 5 shows the use of Compound 2 and a similar organoclay.

TABLE 3

| Rheological Additive | Control using 4 ppb Bentone 155, a smectite organoclay made by Rheox, Inc. | | | | | |
|---|---|---|---|---|---|---|
| Hot Roll Conditions, 16 Hrs. @ ° F. | Initial | 150 | 300 | 350 | 150 | 150 |
| Viscosity @ ° F. | 120 | 120 | 120 | 120 | 150 | 180 |

TABLE 3-continued

| Rheological Additive | Control using 4 ppb Bentone 155, a smectite organoclay made by Rheox, Inc. | | | | | |
|---|---|---|---|---|---|---|
| Plastic Viscosity, cp | 31 | 39 | 30 | 37 | 27 | 21 |
| Yield Point, lbs/100 sq ft | 29 | 28 | 20 | 4 | 21 | 16 |
| Apparent Viscosity | 45.5 | 53 | 40 | 39 | 37.5 | 29 |
| Gels, 10 sec/10 min. Brookfield 1VT #3 Viscosity, cp | 13/15 | 14/17 | 10/17 | 4/9 | 10/13 | 9/12 |
| 30 RPM | 1200 | 1260 | 720 | 200 | 880 | 800 |
| 3 RPM | 8000 | 8400 | 4400 | 600 | 6000 | 5200 |
| 0.3 RPM | 43200 | 32000 | 24000 | 4000 | 28000 | 19200 |
| Emulstion Stability, Volts Fann Model 35A | 1090 | 1180 | 750 | 721 | 1120 | 1050 |
| 600 RPM | 91 | 106 | 80 | 78 | 75 | 58 |
| 300 RPM | 60 | 67 | 50 | 41 | 48 | 37 |
| 200 RPM | 48 | 54 | 39 | 27 | 39 | 30 |
| 100 RPM | 35 | 38 | 27 | 15 | 28 | 22 |
| 6 RPM | 14 | 18 | 11 | 2 | 11 | 10 |
| 3 RPM | 13 | 16 | 10 | 2 | 10 | 9 |

TABLE 4

| Rheological Additive | Compound 1 and Bentone 155 additive | | | | | |
|---|---|---|---|---|---|---|
| Hot Roll Conditions, 16 Hrs. @ ° F. | Initial | 150 | 300 | 350 | 150 | 150 |
| Viscosity @ ° F. | 120 | 120 | 120 | 120 | 150 | 180 |
| Plastic Viscosity, cp | 32 | 39 | 41 | 33 | 29 | 22 |
| Yield Point, lbs/100 sq ft | 35 | 32 | 19 | 12 | 26 | 23 |
| Apparent Viscosity | 49.5 | 55 | 50.5 | 39 | 42 | 33.5 |
| Gels, 10 sec/10 min. Brookfield LVT #3 Viscosity, cp | 19/17 | 22/20 | 13/12 | 9/17 | 15/21 | 13/18 |
| 30 RPM | 1520 | 1640 | 1120 | 420 | 1280 | 1000 |
| 3 RPM | 10800 | 12000 | 8000 | 2400 | 9000 | 6400 |
| 0.3 RPM | 32000 | 40000 | 34000 | 13200 | 36000 | 25200 |
| Emulsion Stability, Volts Fann Model 35A | 1120 | 1020 | 710 | 645 | 1000 | 1060 |
| 600 RPM | 99 | 110 | 101 | 78 | 84 | 67 |
| 300 RPM | 67 | 71 | 60 | 45 | 55 | 45 |
| 200 RPM | 54 | 57 | 46 | 32 | 45 | 37 |
| 100 RPM | 40 | 42 | 32 | 19 | 34 | 28 |
| 6 RPM | 19 | 22 | 13 | 6 | 16 | 14 |
| 3 RPM | 17 | 20 | 12 | 5 | 15 | 12 |

TABLE 5

| Rheological Additive | Compound 2 and Bentone 155 | | | | | |
|---|---|---|---|---|---|---|
| Hot Roll Conditions, 16 Hrs. @ ° F. | Initial | 150 | 300 | 350 | 150 | 150 |
| Viscosity @ ° F. | 120 | 120 | 120 | 120 | 150 | 180 |

TABLE 5-continued

| Rheological Additive | Compound 2 and Bentone 155 | | | | | |
|---|---|---|---|---|---|---|
| Plastic Viscosity, cp | 35 | 40 | 40 | 35 | 28 | 21 |
| Yield Point, lbs/100 sq ft | 35 | 36 | 17 | 13 | 31 | 27 |
| Apparent Viscosity | 52.5 | 58 | 48.5 | 41.5 | 43.5 | 34.5 |
| Gels, 10 sec/10 min. Brookfield, LVT #3 Viscosity, cp | 18/17 | 23/21 | 13/12 | 10/18 | 18/16 | 14/13 |
| 30 RPM | 1460 | 1700 | 1040 | 520 | 1340 | 960 |
| 3 RPM | 9400 | 12600 | 7200 | 3200 | 9600 | 6000 |
| 0.3 RPM | 35200 | 42000 | 32000 | 16000 | 40800 | 29200 |
| Emulsion Stability, Volts Fann Model 35A | 1100 | 1128 | 715 | 660 | 1125 | 1120 |
| 600 RPM | 105 | 116 | 97 | 83 | 87 | 69 |
| 300 RPM | 70 | 76 | 57 | 48 | 59 | 48 |
| 200 RPM | 58 | 60 | 45 | 34 | 48 | 38 |
| 100 RPM | 42 | 44 | 30 | 21 | 35 | 29 |
| 6 RPM | 18 | 23 | 13 | 6 | 18 | 14 |
| 3 RPM | 17 | 21 | 12 | 5 | 16 | 13 |

The data from Table 3 to 5 show a similar trend to that observed in Example 1 (Table 1). Again, low shear rate viscosity is increased at a faster rate then plastic viscosity. Data shown on each table shows that Compound 1 and Compound 2 in combination with an organoclay exhibit higher viscosity when tested at 150° F. and 180° F.

While the present invention has been described with reference to particular embodiments thereof, it will be understood that numerous modifications and obvious changes can be made by those skilled in the art without departing from the scope and spirit of the invention. These may include other copolymers of olefin and ethlenically unsaturated carboxylic acids, partial neutralization with the described agents or other agents and incorporated with or without other additives. Accordingly, all such modifications and equivalents fall within the scope of the invention as claimed.

We claim:

1. An oil well drilling fluid with improved anti-settling properties consisting essentially of:
   a) an oil well drilling base fluid and
   b) from about 0.5 to about 8 weight percent based on the total weight of the oil well drilling fluid of a neutralized copolymer having a molecular weight from about 500 to about 20,000 prepared by a reaction consisting essentially of:
      i) reacting one or more alpha-olefins, and
      ii) one or more alpha, beta ethylenically unsaturated carboxylic compounds to form a copolymer acid, followed by
      iii) neutralizing the copolymer acid with a neutralization compound selected from the group consisting of Group IA metal compounds, ammonia and organic amines.

2. The drilling fluid of claim 1 wherein the drilling fluid base mud is an oil-based invert emulsion drilling fluid.

3. The drilling fluid of claim 1 wherein reactant b(i) is an ethylene alpha-olefin, reactant b)(ii) is a carboxylic acid and the neutralization compound b(iii) is selected from the group consisting of triethanol amine, n-methyl diethanol amine and diethylamino-ethanol.

4. The drilling fluid of claim 1 wherein the copolymer acid is neutralized before incorporation into said drilling fluid.

5. The drilling fluid of claim 1 wherein one or more rheologically active clay-based materials are incorporated into said drilling fluid.

6. The drilling fluid of claim 5 wherein said neutralized copolymer and a rheologically active clay-based material are simultaneously incorporated into the drilling fluid.

7. The drilling fluid of claim 5 wherein the rheologically active clay-based materials are selected from the group consisting of organoclays, and smectite-type clays selected from the group consisting of hectorite and bentonite.

8. A method of providing improved anti-settling properties to an oil well drilling fluid consisting essentially of:
   a) preparing an oil well drilling fluid and;
   b) incorporating into said drilling fluid a neutralized copolymer having a molecular weight from about 500 to about 20,000 in the amount of from about 0.5 to about 8 weight percent which copolymer is prepared by a reaction comprising:
      i) one or more alpha-olefins and
      ii) one or more alpha, beta ethylenically unsaturated carboxylic compounds,
      followed by neutralization with a compound selected from the group consisting of IA metal compounds, ammonia and an organic amine, thereby producing a drilling fluid with improved anti-settling properties.

9. The method of claim 8 wherein reactant b(i) is an ethylene alpha-olefin, reactant b(ii) is a carboxylic acid and the neutralization compound is selected from the group consisting of triethanol amine, n-methyl diethanol amine and diethylamino-ethanol.

10. The method of claim 8 wherein the copolymer is neutralized before incorporation into said drilling fluid.

11. The method of claim 8 wherein as an addition process step, one or more rheologically active clay-based materials are incorporated into said drilling fluid.

12. The method of claim 11 wherein the said copolymer and said rheologically active clay-based material are simultaneously incorporated into the drilling fluid.

13. The method of claim 11 wherein the rheologically active clay-based materials are selected from the group consisting of organoclays, and smectite-type clays selected from the group consisting of hectorite and bentonite.

14. A method according to claim 8, wherein said reaction further comprises reacting an additional copolymerizable monomer selected from the group consisting of vinyl acetate, vinyl pyrrolidone, methyl vinyl ether, and ethyl vinyl ether.

15. An oil-based invert emulsion drilling fluid system with improved anti-settling properties consisting essentially of:
   a) an oil-based invert emulsion drilling fluid and
   b) from about 0.5 to about 8 weight percent based on the total weight of the drilling fluid of a neutralized copolymer having a molecular weight from about 500 to about 20,000 prepared by a reaction consisting essentially of:
      i) reacting one or more alpha-olefins, and
      ii) one or more alpha, beta ethylenically unsaturated carboxylic compounds to form a copolymer acid, followed by,
      iii) neutralizing the copolymer acid with a neutralization compound selected from the group consisting of Group IA metal compounds, ammonia and organic amines and;
   c) one or more rheologically active clay-based materials.

16. The drilling fluid system of claim 15 wherein the drilling fluid is an oil based-invert emulsion drilling fluid especially designed for off-shore drilling operations.

17. The system of claim 15 wherein reactant b(i) is an ethylene alpha-olefin, reactant b)(ii) is a carboxylic acid and the neutralization compound is selected from the group consisting of triethanol amine, n-methyl diethanol amine and diethylamino-ethanol.

18. The system of claim 15 wherein the copolymer acid is neutralized before incorporation into said drilling fluid.

19. The system of claim 15 wherein the neutralized copolymer and the rheologically active clay based material are simultaneously incorporated into said drilling fluid.

20. The system of claim 15 wherein the rheologically active clay-based materials are selected from the group consisting of organoclays and smectite-type clays selected from the group consisting of hectorite and bentonite.

21. The system of claim 20 one or more of the rheologically active clay-based materials is an organoclay.

22. A method of providing improved anti-settling properties to an oil well drilling fluid consisting essentially of:
   a) preparing an oil well drilling fluid and;
   b) incorporating into such drilling fluid:
      (1) a copolymer in the amount of from about 0.5 to about 8 weight percent which copolymer having a molecular weight from about 500 to about 20,000 is prepared by a reaction consisting essentially of:
         i) reacting one or more alpha-olefins and
         ii) one or more alpha, beta ethylenically unsaturated carboxylic compounds to form a copolymer acid, followed by neutralizing the copolymer acid with a neutralization compound selected from the group consisting of Group IA metal compounds, ammonia and an organic amine and;
      (2) one or more rheologically active clay-based materials, thereby producing a drilling fluid with improved anti-settling properties.

23. The method of claim 22 wherein the neutralized copolymer of paragraph b)1) and the one or more rheologically active clay-based materials of paragraph b)2) are simultaneously incorporated into said drilling fluid.

24. The method of claim 22 wherein reactant (i) is an ethylene alpha-olefin, reactant (ii) is a carboxylic acid and the neutralization compound is selected from the group consisting of triethanol amine, n-methyl diethanol amine and diethylamino-ethanol.

25. The method of claim 22 wherein the rheologically active clay-based materials are selected from the group consisting of organoclays and smectite-type clays selected from the group consisting of hectorite and bentonite.

26. A composition of matter especially useful to provide improved anti-settling properties to oil well drilling fluids consisting essentially of:
   (1) a copolymer having a molecular weight from about 500 to about 20,000 prepared by a reaction consisting essentially of:
      i) reacting one or more alpha-olefins and
      ii) one or more alpha, beta ethylenically unsaturated carboxylic compounds to form a copolymer acid, following by neutralizing the copolymer acid with a neutralization compound selected from the group consisting of Group IA metal compounds, ammonia and an organic amine and;
   (2) one or more rheologically active clay-based materials.

27. The composition of matter of claim 26 wherein reactant (i) is an ethylene alpha-olefin, reactant (ii) is a carboxylic acid and the neutralization compound is selected from the group consisting of triethanol amine, n-methyl diethanol amine and diethylamino-ethanol.

28. The composition of matter of claim 26 wherein the rheologically active clay-based materials are selected from the group consisting of organoclays and smectite-type clays selected from the group consisting of hectorite and bentonite.

29. An oil well drilling fluid with improved anti-settling properties consisting of:
   a) an oil well drilling base fluid and
   b) from about 0.5 to about 8 weight percent based on the total weight of the oil well drilling fluid of a neutralized copolymer having a molecular weight from about 500 to about 20,000 prepared by a reaction consisting of:
      i) reacting one or more alpha-olefins, and
      ii) one or more alpha, beta ethylenically unsaturated carboxylic compounds to from a copolymer acid, followed by
      iii) neutralizing the copolymer acid with a neutralization compound selected from the group consisting of Group IA metal compounds, ammonia and organic amines to form an amine salt.

30. An oil well drilling fluid, consisting essentially of:
   a) an oil well drilling base fluid; and
   b) a anti-settling, synergistically-effective amount of a neutralized copolymer prepared by a reaction consisting essentially of:
      i) reacting one or more alpha-olefins, and
      ii) one or more alpha, beta ethylenically unsaturated carboxylic compounds to from a copolymer acid, followed by
      iii) neutralizing the copolymer acid with a neutralization compound selected from the group consisting of Group IA metal compounds, ammonia and organic amines to form an amine salt.

31. An oil well drilling fluid according to claim 30, wherein the one or more alpha, beta ethylenically unsaturated carboxylic compounds is an anhydride.

32. An oil well drilling fluid according to claim 31, wherein said anhydride is maleic anhydride.

33. An oil well drilling fluid according to claim 30, wherein said neutralized copolymer is a neutralized ethylene-acrylic acid copolymer.

34. An oil well drilling fluid according to claim 30, wherein said neutralized copolymer is a neutralized ethylene-acrylic acid-vinyl acetate terpolymer.

35. An oil well drilling fluid according to claim 30, wherein said neutralized copolymer is an amine salt.

36. An oil well drilling fluid according to claim 30, wherein the neutralization compound is a Group IA metal compound.

* * * * *